United States Patent
Liu et al.

(10) Patent No.: US 11,836,637 B2
(45) Date of Patent: Dec. 5, 2023

(54) CONSTRUCTION METHOD OF HUMAN-OBJECT-SPACE INTERACTION MODEL BASED ON KNOWLEDGE GRAPH

(71) Applicant: Tianjin University, Tianjin (CN)

(72) Inventors: Xiulong Liu, Tianjin (CN); Juncheng Ma, Tianjin (CN); Xuesong Gao, Tianjin (CN); Wenyu Qu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/967,014

(22) Filed: Oct. 17, 2022

(65) Prior Publication Data

US 2023/0306282 A1   Sep. 28, 2023

(30) Foreign Application Priority Data

Mar. 24, 2022  (CN) .......................... 202210298126.6

(51) Int. Cl.
*G06N 5/022*   (2023.01)

(52) U.S. Cl.
CPC .................................... *G06N 5/022* (2013.01)

(58) Field of Classification Search
CPC ..................................................... G06N 5/022
See application file for complete search history.

(56) References Cited

U.S. PATENT DOCUMENTS

2019/0312869 A1* 10/2019 Han ....................... G06F 21/64
2022/0075948 A1*  3/2022 Yuan .................. G06F 16/9024

OTHER PUBLICATIONS

Pang, Y. et al., A New Consensus Protocol for Blockchain Interoperability Architecture, https://ieeexplore.ieee.org/document/9170602 (Year: 2020).*

Wang, S. et al., "Decentralized Construction of Knowledge Graphs for Deep Recommender Systems Based on Blockchain-Powered Smart Contracts", https://ieeexplore.ieee.org/document/8844724 (Year: 2019).*

Yang, G. et al., "Distributed fusion cross-chain model and architecture", https://ietresearch.onlinelibrary.wiley.com/doi/10.1049/blc2.12013, Mar. 17, 2022 (Year: 2022).*

(Continued)

*Primary Examiner* — Alexey Shmatov
*Assistant Examiner* — Devika S Maharaj
(74) *Attorney, Agent, or Firm* — Zhigang Ma

(57) ABSTRACT

A construction method of human-object-space interaction model based on knowledge graph belongs to the technical field of knowledge graph construction and smart communities and includes steps of: obtaining information from a large number of active and passive sensing devices and thereby building a knowledge base; and fusing perceptual information in the knowledge base, forming entity-relation-entity structured data, and building a general knowledge graph conceptual model with entity-relation attributes. The construction method can overcome technical problems such as difficulty in multi-source information extraction, inability to fuse heterogeneous data, and inability of interaction of human-object-space caused by poor universality of perception technology and complex entity relations in a smart community environment, and provide a method support for monitoring and early warning of dangerous events in the smart community and community environment situational awareness.

4 Claims, 4 Drawing Sheets

(56) References Cited

OTHER PUBLICATIONS

Wang, S. et al., "Geographic Knowledge Graph (GeoKG): A Formalized Geographic Knowledge Representation", https://www.mdpi.com/2220-9964/8/4/184 (Year: 2019).*
Djenouri, Y. et al., "Intelligent Blockchain Management for Distributed Knowledge Graphs in IoT 5G environments", https://onlinelibrary.wiley.com/doi/10.1002/ett.4332 (Year: 2021).*
CNIPA, Notification of a First Office Action for CN202210298126.6, dated Nov. 1, 2022.
Tianjin University (Applicant), Reply to Notification of a First Office Action for CN202210298126.6, w/ (allowed) replacement claims, dated Nov. 2, 2022.
CNIPA, Notification to grant patent right for invention in CN202210298126.6, dated Jan. 5, 2023.

* cited by examiner

CONSTRUCTION METHOD OF HUMAN-OBJECT-SPACE INTERACTION MODEL BASED ON KNOWLEDGE GRAPH

TECHNICAL FIELD

The disclosure belongs to the technical field of knowledge graph constructions and smart communities, and relates to a multi-source heterogeneous information abstraction technology, a partition fusion technology and graph-based complex relation network expression, in particular to a construction method of human-object-space interaction model based on knowledge graph.

BACKGROUND

A smart community is a new community mode in the era of interconnection of all things; the smart community is to apply 5th generation mobile networks (5G), edge computing, cloud computing and various perception technologies in the infrastructure of the community, integrating all smart devices by the Internet and the Internet of Things (IOT), so that the community can "see", "hear", "identify", and "predict", so as to create a safe, comfortable, convenient and intelligent living environment for community residents, thus obtaining a new community mode with intelligent equipment, informationized life and transparent management. At present, in the technology of security monitoring and early warning of smart communities, a main technology is to input acquired data of IOT equipment into the pre-trained model for a data feature fusion, and then extracting behavioral feature data, and then transmitting the behavioral feature data to an analysis platform for analysis and processing by a traditional principal component analysis, a linear discriminant analysis or a statistical analysis; finally, feeding back security monitoring results and security trends of the community situation by a central processing platform.

The disadvantage of the above technology is that it usually solves problems of security monitoring in the case of a small number of sensors and single type of data, and simply inputs collected data into an analysis model as a whole; when it deals with a huge volume of data with complex relations in a human-object-space scene, the accuracy of traditional analysis method will be greatly weakened. At present, knowledge graph technologies are widely used in various fields, and knowledge graph models in the respective fields are also constructed, such as knowledge graphs for specific medical, dynamic finance and other fields; knowledge graphs often express complex relation networks in a triplet structure, that is, extracting relations by identifying entities in described knowledge data, and then expressing relationships of entity-relationship-entity in form of graphs. Therefore, the disclosure aims to provide a construction method of human-object-space interaction model based on knowledge graph, which can effectively overcome technical problems such as difficulty in multi-source information extraction, inability to fuse heterogeneous data, and inability of interaction of human-object-space caused by poor universality of perception technology and complex entity relations in a smart community environment, and provide a method support for monitoring and early warning of dangerous events in the smart community and community environment situational awareness.

SUMMARY

Technical Problem to be Solved

A purpose of the disclosure is to provide a construction method of multi-source heterogeneous data interaction model, which can effectively overcome technical problems such as difficulty in multi-source information extraction, inability to fuse heterogeneous data, and inability of interaction of human-object-space caused by poor universality of perception technology and complex entity relations in a smart community environment, and provide a method support for monitoring and early warning of dangerous events in the smart community and community environment situational awareness.

In order to achieve the above purpose, the disclosure proposes the following technical solutions.

A construction method of human-object-space interaction model based on knowledge graph, including the following steps:

S1: obtaining information from a large number of active and passive sensing devices and thereby building a knowledge base;

S2: fusing perceptual information in the knowledge base built in S1 to obtain entity-relation-entity structured data, and building a general knowledge graph conceptual model with entity-relation attributes;

S3: materializing human-object-space information in different geographical locations (after building the general knowledge graph conceptual model with entity-relation attributes), building a multi-layered interaction knowledge graph entity model, and maintaining its blockchains;

S4: obtaining a traceable multi-layered knowledge graph model by cross-chain fusion of the blockchains;

S5: for a plurality of knowledge graph partitions organized by the geographical locations at a bottom layer, aggregating similar knowledge graph partitions by feature clustering to generate knowledge graph clusters; and S6: fusing entities and relations of knowledge graph from bottom to top, abstracting higher-layer knowledge graph information, and generating a global knowledge graph with higher abstract information at its top layer.

Furthermore, the construction method may further include: monitoring dangerous events in a smart community based on the global knowledge graph and/or performing situational awareness in a community environment based on the global knowledge graph.

Preferably, specific steps for implementing the S1 may be as follows:

S101, acquiring entity information and direct relations among entities from data sources; the data sources including the Internet, intelligent community edge computing devices, edge sensors and other data sensing devices; and the data sensing devices being used to acquire data information such as temperature information, video information, vehicle license plate information, and user information;

S102, using a series of automatic or semi-automatic technical means to extract knowledge elements from original data, and storing extracted knowledge elements into a schema layer and a data layer of the knowledge base.

Preferably, specific steps for implementing S2 may be as follows:

S201, after abstracting the knowledge elements, storing basic attribute knowledge, relation knowledge, and event knowledge;

S202: extracting entities, attributes, and relations among the entities from various types of data sources;

S203: fusing new knowledge and eliminating contradiction and ambiguation;

S204: performing quality evaluation on fused new knowledge; and

S205: building a knowledge graph through repeated iteration and updating as per S201 to S204.

Preferably, specific steps for implementing S3 may be as follows:

S301: partitioning a human-object-space interaction knowledge graph (i.e., the multi-layered interaction knowledge graph entity model) for the different geographical locations obtain knowledge graph partitions, and the knowledge graph partitions maintaining respective private blockchains; for a same geographical location, heterogeneous data from different sources being needed to be uploaded to the private chain, and after all nodes on the private blockchain are audited and reach a consensus, retaining effective heterogeneous data configured (i.e., structured and arranged) to enter a next stage of the cross-chain fusion and obtain the traceable multi-layered knowledge graph model; and S302: during collecting the heterogeneous data, using device security elements from different sources as equity content, and using a real-time clustering technology to cache different real-time stream data and verify the data; using a decentralized structure of the private blockchain, which is easy to reach a consensus, so that the whole system has a fast response speed and a high efficiency; a consensus mechanism being a verification pool consensus mechanism, which is based on the traditional distributed consistency technology and data verification technology and thus is suitable for a scenario with weak decentralization.

Preferably, specific steps for implementing S4 may be as follows:

S401: the private chains maintained by the respective knowledge graph partitions, based on a multi-layered multi-chain architecture of side chains or relay chains, completing a traceable fusion of multi-source knowledge graph partitions by a cross-chain data fusion technology;

S402: the cross-chain data fusion technology ensuring to use a technology rather than institutions or people to provide a safe, reliable and efficient on-chain information interaction path; the private chain maintained by each the knowledge graph partition being used as a side chain to work in parallel with a main blockchain, and nodes of the main blockchain connecting to the side chain or being connected by the side chain; and S403: the side chain collecting, independently from the main blockchain, the heterogeneous data of multiple source devices in a corresponding one geographical location, or performing data fusion of heterogeneous data together with the main blockchain.

Preferably, during an implementation of S5, initial knowledge graph partitions are organized by the geographical locations, although distances of the geographical locations among the partitions are close, two adjacent knowledge graph partitions may still have large differences due to the complexity and heterogeneity of data. Therefore, a solution is proposed as follows:

S501: extracting main features of each knowledge graph partition by feature engineering; and S502: classifying a series of knowledge graph partitions by using a machine learning feature clustering method, after the classifying, knowledge graph partitions in a same class have similar node information and node numbers/amounts, which is convenient for subsequent query and storage.

Preferably, specific steps for implementing hierarchical abstraction of knowledge graphs in S6 may be as follows:

S601: for the global knowledge graph being queryable anywhere at its bottom layer, performing abstract fusion on the knowledge graph clusters generated in S5, wherein knowledge graph partitions in the same knowledge graph cluster are fused to obtain a higher-layer abstract knowledge graph; and using a cross-chain fusion technology of blockchains to store knowledge graphs abstracted layer by layer, the knowledge graph stored at the topmost layer being similar to a root node, and thereby gradually searching down from the abstract knowledge graph stored at the topmost layer to obtain more specific information when querying.

The model built by the disclosure may have good robustness and wide applicability, and can be deployed in environments where general systems with poor universality of sensing technologies and complex human-object interactions are difficult to work. In the disclosure, a knowledge graph technology is innovatively employed to complete nodalization modeling on information of complex people, objects and human-object-space interactions in an environment, and a blockchain technology is further employed to realize a cross-chain fusion. The technical solution of the disclosure may have strong application value and scientific research value, and can provide model supports for dangerous event monitoring and situation awareness methods in smart communities. Specific beneficial effects may be the following three points.

(1) In an environment with multiple source devices, wireless signals in a perception space are complex and difficult to quantify, and protocols followed by the wireless signals are also diverse, which greatly limits the efficiency of objective model construction and query. The disclosure proposes a cross-source knowledge graph information extraction and fusion technology, a knowledge graph has an excellent effect in solving challenges such as huge data quantity and complex relations. By using an entity-relation-entity triplet structure, the disclosure can effectively express a complex relation network through connection manners of nodes and edges of graph network, and create a human-object-space interaction model paradigm in a complex environment such as a smart community.

(2) The disclosure inventively proposes a traceable fusion technology of knowledge graph partitions to solve problems of recognition and alignment of information of human-object-space. In a complex human-object-space environment, multi-source heterogeneous data may produce data ambiguation, that is, a signal emission source and a signal cannot obtain a correct mapping relationship, and signal identity management cannot be carried out in a multi-source system. The disclosure uses fusion of different knowledge graph partitions and traceability technologies to generate a human-object-space interaction knowledge graph (e.g., a multi-layered interaction knowledge graph entity model) for different geographical locations, and each of human-object-space interaction knowledge graph partitions contains all human nodes, object nodes and human-object interaction connections in the corresponding geographical location. Human-object-space interaction knowledge graph partitions in multiple geographical locations form a cluster of graph partitions (also referred to as a knowledge graph cluster), and then a cross-chain fusion technology is used to connect a main blockchain with side chains and thereby obtain a traceable multi-layered knowledge graph partition fusion, e.g., the traceable multi-layered knowledge graph model.

(3) The disclosure innovatively proposes a multi-layered knowledge graph information abstract technology to solve a storage pressure of knowledge graph under a complex human-object-space environment, but a query efficiency is reduced. For a plurality of knowledge graph partitions at a bottom layer organized by different geographical locations, similar knowledge graph partitions are aggregated by feature clustering to obtain entities of knowledge graph fused from bottom to top, relations among the entities are further abstracted, and finally a global knowledge graph with higher abstract information at its top layer is formed to optimize the storage of knowledge graph and improve the query efficiency.

DETAILED DESCRIPTION OF EMBODIMENTS

In the following, technical solutions of embodiments of the disclosure will be clearly and completely described in conjunction with the attached drawings of the embodiments of the disclosure. Apparently, the described embodiments are only some embodiments of the disclosure, rather than all embodiments of the disclosure. Based on the described embodiments of the disclosure, all other embodiments obtained by those ordinary skilled in the art without creative work should belong to the scope of protection of the disclosure.

Embodiment 1

Figure 1:
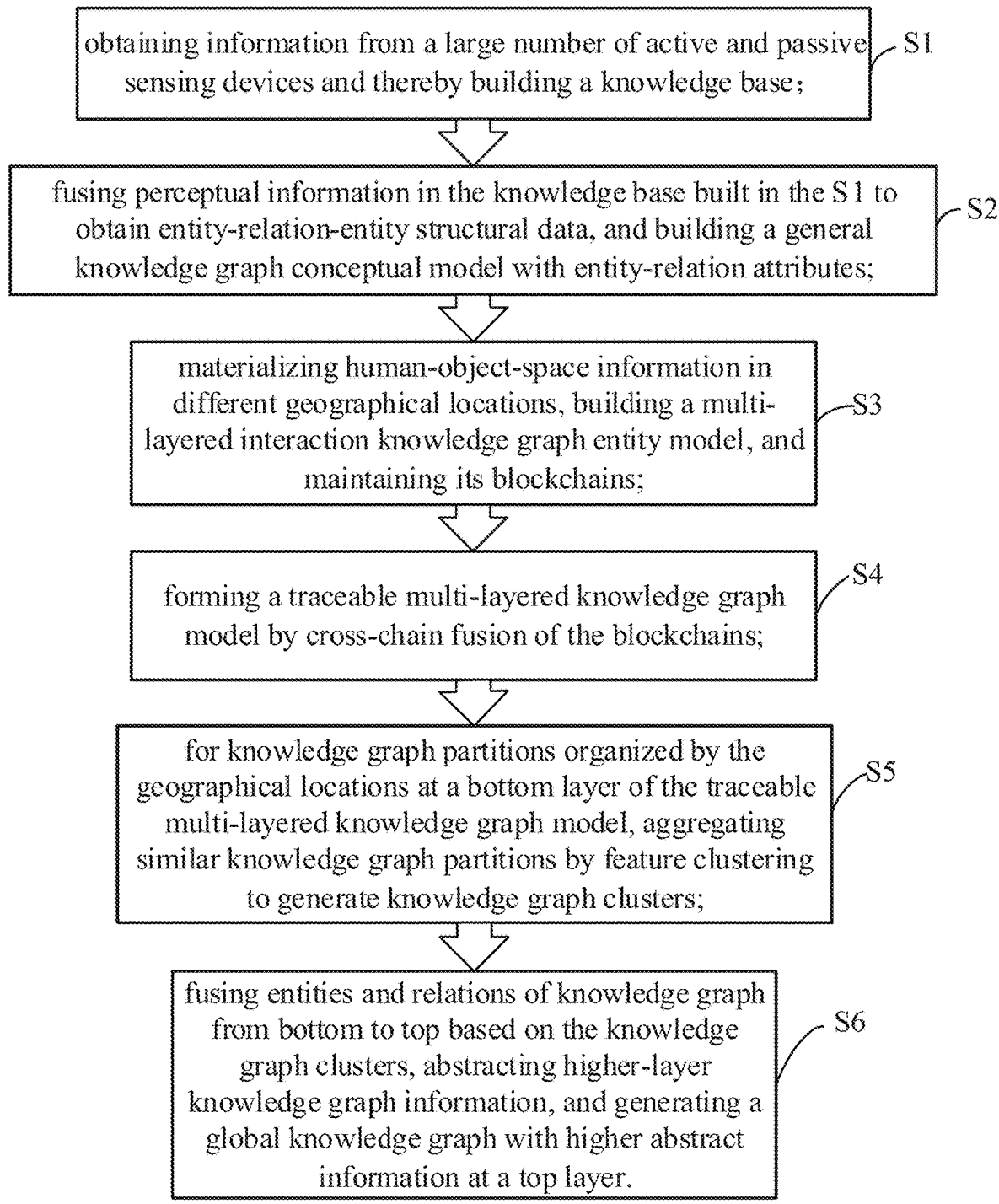
FIG. 1 illustrates a schematic flowchart of a construction method of human-object-space interaction model based on knowledge graph according to the disclosure.

Please refer to FIG. 1, a construction method of human-object-space interaction model based on knowledge graph includes the following steps:

S1: obtaining information from a large number of active and passive sensing devices and thereby building a knowledge base;

S2: fusing perceptual information in the knowledge base built in Si to obtain entity-relation-entity structured data, and building a general knowledge graph conceptual model with entity-relation attributes;

S3: materializing human-object-space information in different geographical locations, building a multi-layered interaction knowledge graph entity model, and maintaining its blockchains;

S4: forming a traceable multi-layered knowledge graph model by cross-chain fusion of the blockchains;

S5: for knowledge graph partitions organized by the geographical locations at a bottom layer of the traceable multi-layered knowledge graph model, aggregating similar knowledge graph partitions by feature clustering to generate knowledge graph clusters; and S6: fusing entities and relations of knowledge graph from bottom to top based on the knowledge graph clusters, abstracting higher-layer knowledge graph information, and generating a global knowledge graph with higher abstract information at a top layer.

In an environment with multiple source devices, wireless signals in a perception space are complex and difficult to quantify, and protocols followed by the wireless signals are also diverse, which greatly limits the efficiency of objective model construction and query. The disclosure proposes a cross-source knowledge graph information extraction and fusion technology, a knowledge graph has an excellent effect in solving challenges such as huge data volume and complex relations, and by using an entity-relation-entity triplet structure, the disclosure can effectively express a complex relation network through connection manners of nodes and edges of graph network and create a human-object-space interaction model paradigm in a complex environment such as a smart/intelligent community. The model constructed by the disclosure may have good robustness and wide applicability, and can be deployed in environments with poor universality of sensing technologies and complex human-object interactions where general systems are difficult to work. In the disclosure, a knowledge graph technology is innovatively employed to complete nodalization modeling on information of complex people, objects and human-object-space interactions in an environment, and a blockchain technology is employed to realize a cross-chain fusion. The technical solution of the disclosure may have strong application value and scientific research value, and can provide model supports for dangerous event monitoring and situation awareness methods in smart communities.

Embodiment 2

The embodiment 2 is based on the embodiment 1, and differences thereof are as follows.

Figure 6:
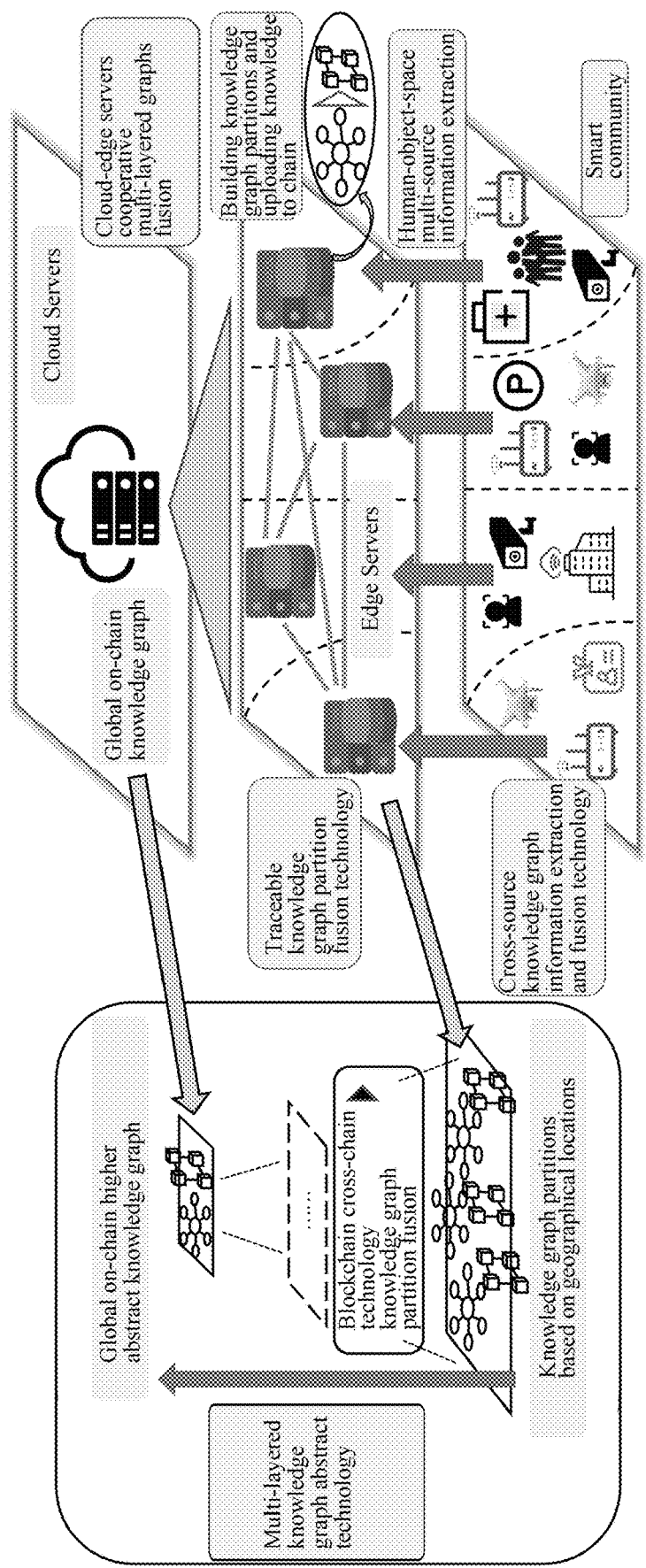
FIG. 6 illustrates a schematic diagram of model construction in a construction method of human-object-space interaction model based on knowledge graph according to the disclosure.

Specifically, the disclosure provides a construction method of human-object-space interaction model based on knowledge graph, a schematic diagram of model construction diagram of a concrete embodiment of the disclosure is shown in FIG. 6, and a specific implementation process may be as follows.

Figure 2:
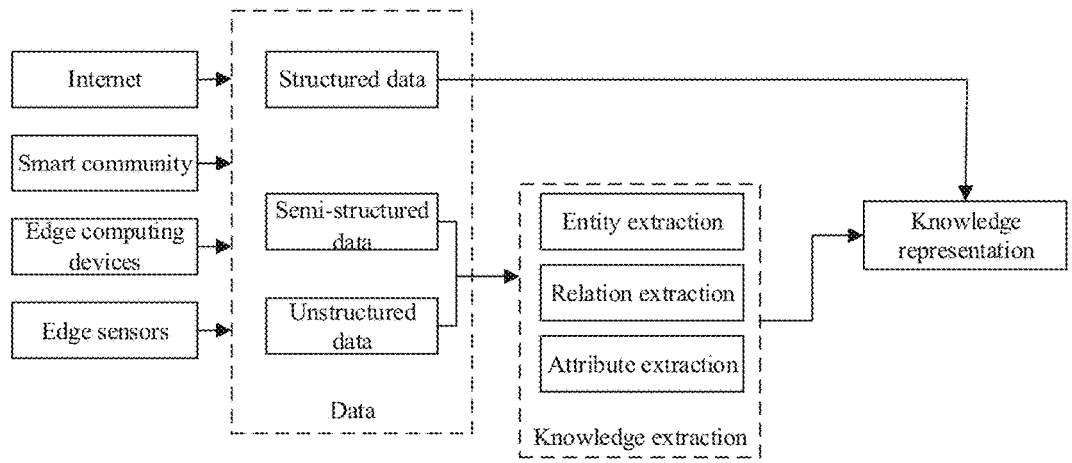
FIG. 2 illustrates a schematic flowchart of knowledge representation in the construction method of human-object-space interaction model based on knowledge graph according to the disclosure.

In S101: there are many complex signals about such as Wireless Fidelity (WiFi), camera, BLUETOOTH, ZigBee and radio frequency identification (RFID) in a smart community environment, entity information and direct relations among entities are acquired from data sources such as Internet, a smart community, and edge computing devices and edge sensors deployed in the community; various perceptual information such as temperature information, video information, vehicle license plate information and user information are collected, which may be structured, unstructured or semi-structured; technical means then are used to extract knowledge elements from original data, and the extracted knowledge elements are stored/saved into a schema layer and a data layer of a knowledge base, as shown in FIG. 2.

In S201: after being abstracted into the knowledge elements, basic attribute knowledge, relation knowledge, and event knowledge are stored.

In S202: entities, attributes, and relations among the entities are extracted from various types of data sources;

In S203: new knowledge is fused, and contradiction and ambiguation are eliminated.

In S204: quality evaluation is performed on the fused new knowledge.

Figure 3:
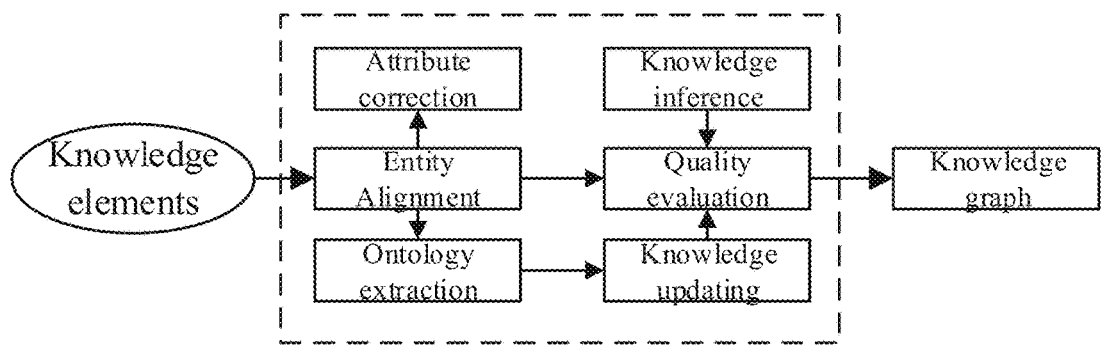
FIG. 3 illustrates a schematic diagram of a knowledge graph conceptual model in the construction method of human-object-space interaction model based on knowledge graph according to the disclosure.

In S205: a knowledge graph (e.g., the general knowledge graph conceptual model) is built through repeated iteration and updating as per S201 to S204, as shown in FIG. 3.

Figure 4:
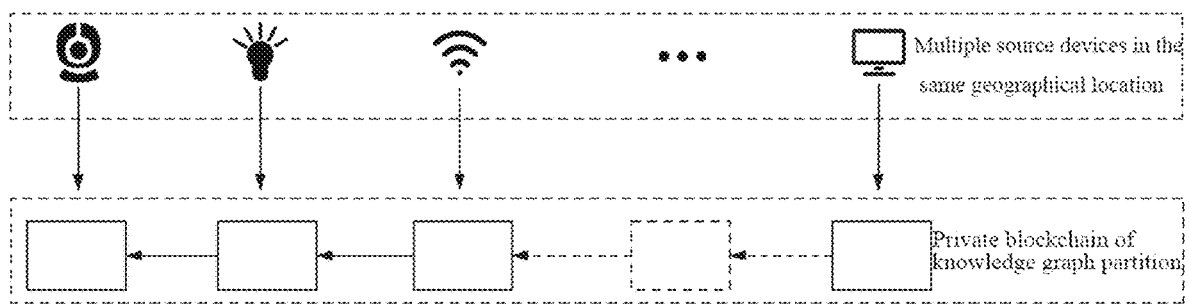
FIG. 4 illustrates a schematic diagram of multiple source devices being linked to a blockchain in the construction method of human-object-space interaction model based on knowledge graph according to the disclosure.

In S301: a human-object-space interaction knowledge graph (e.g., the multi-layered interaction knowledge graph entity model) for different geographical locations is partitioned to obtain knowledge graph partitions, and each of the knowledge graph partitions maintains a private blockchain (also referred to as private chain); for a same one of the geographical locations, heterogeneous data from different sources are needed to be uploaded to the private blockchain, and after all nodes on the private blockchain are audited and reach a consensus, effective heterogeneous data are retained to enter a next stage of the cross-chain fusion and thereby obtain a traceable multi-layered knowledge graph model, as shown in FIG. 4.

In S302: during collecting the heterogeneous data, device security elements from different sources are used as equity content; and meanwhile, a real-time clustering technology is used to cache different real-time stream data and verify the data. The decentralized structure of private blockchain makes it is easier to reach a consensus, so that the whole system may have a faster response speed and a higher efficiency. In addition, a verification pool consensus mechanism is employed, which is based on the traditional distributed consistency technology and data verification technology, and thus is suitable for scenarios with weak decentralization.

In S401: the private blockchains maintained by the respective knowledge graph partitions, based on a multi-layered multi-chain architecture of side chains or relay chains, complete a traceable fusion of multi-layered knowledge graph partitions by cross-chain data fusion.

Figure 5:
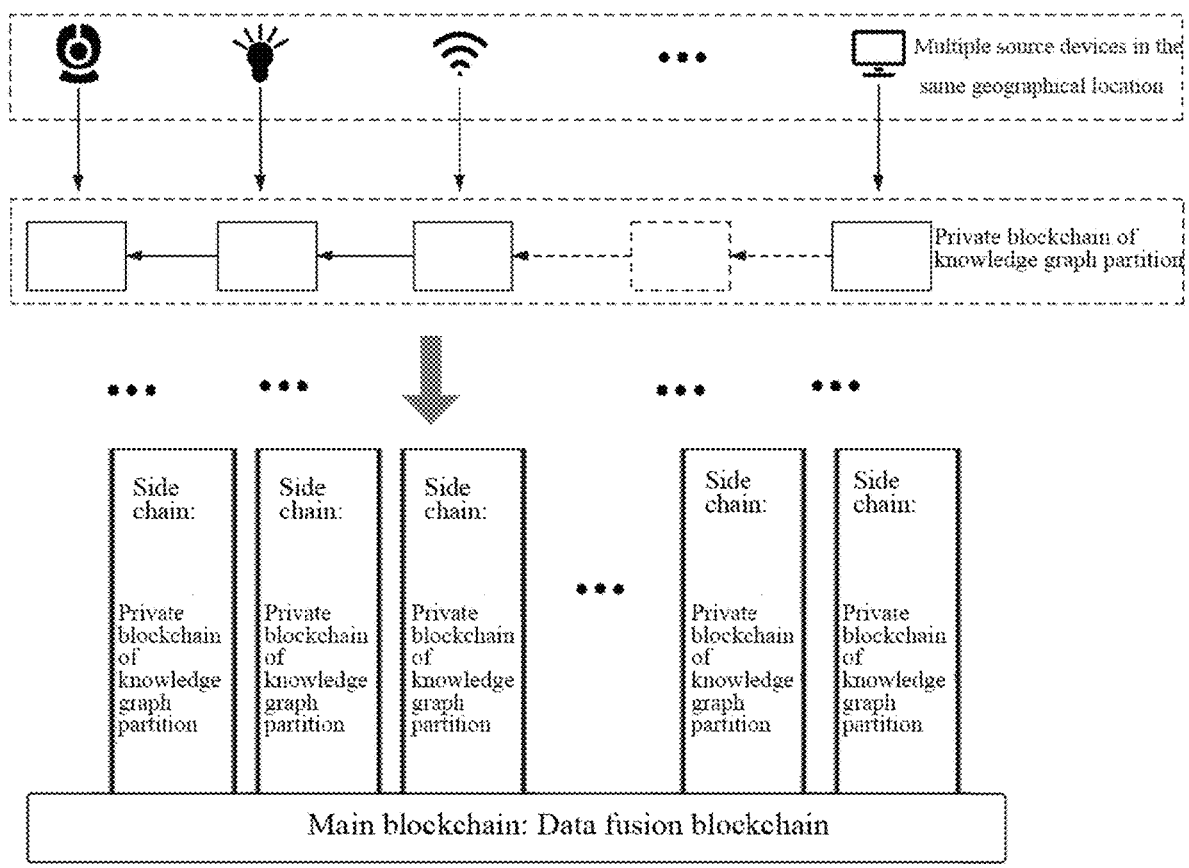
FIG. 5 illustrates a schematic diagram of data fusion of a main blockchain and side chains in the construction method of human-object-space interaction model based on knowledge graph according to the disclosure.

In S402: the cross-chain data fusion ensures using a technology rather than institutions or people to provide a safe, reliable and efficient on-chain information transmission path, the private blockchain maintained by each the knowledge graph partition is used as a side chain and work in parallel with a main blockchain, and nodes of the main blockchain can be connected to the side chain or connected by the side chain, as shown in FIG. 5.

In S403: each the side chain not only can be operated independently from the main blockchain and can independently collect the heterogeneous data of multiple source devices at a single geographical location, but also can work together with the main blockchain when needed and carry out data fusion of heterogeneous data with the main blockchain.

In S501: main features of the knowledge graph partitions are extracted by feature engineering, and the extracted main features include an entity of central node, the number/amount of entities, and relations among the entities in each the knowledge graph partition.

In S502: a machine learning feature clustering method is used to classify a series of knowledge graph partitions, and after the classifying, knowledge graph partitions in a same class (as a knowledge graph cluster) have similar node information and node numbers/quantities, which is convenient for subsequent query and storage.

S601: for a global knowledge graph being queryable anywhere at its bottom layer, abstract fusion is performed on the knowledge graph clusters generated in S502. The knowledge graph partitions in the same cluster are fused to obtain a higher-layer abstract knowledge graph, a cross-chain fusion technology of blockchains is used to store the knowledge graphs abstracted layer by layer and thereby form a bottom-up pyramidal information abstract model, the knowledge graph stored at the topmost layer is similar to a root node. During querying, it gradually searches down from the knowledge graph stored at the topmost layer to obtain more specific information.

The disclosure inventively proposes a traceable fusion technology of knowledge graph partitions to solve problems of recognition and alignment of information of human-object-space. In a complex human-object-space environment, multi-source heterogeneous data may produce data ambiguation, that is, a signal emission source and a signal cannot obtain a correct mapping relationship, and signal identity management cannot be carried out in a multi-source system. The disclosure uses fusion of different knowledge graph partition fusion and traceability technologies to generate a human-object-space interaction knowledge graph (e.g., multi-layered interaction knowledge graph entity model) for different geographical locations, and each of the human-object-space interaction knowledge graph partitions contains all human nodes, object nodes and human-object interaction connections in the corresponding geographical location. Human-object-space interaction knowledge graph partitions in multiple geographical locations form a cluster/set/series of graph partitions (also referred to as knowledge graph cluster), and then a cross-chain fusion technology is used to connect a main blockchain with side chains and thereby obtain a traceable multi-layered knowledge graph partition fusion, e.g., the traceable multi-layered knowledge graph model.

The disclosure employs a multi-layered knowledge graph information abstract technology to solve a storage pressure of knowledge graph under a complex human-object-space environment, but a query efficiency is reduced. For multiple knowledge graph partitions at a bottom layer generated for different geographical locations, similar knowledge graph partitions are aggregated by feature clustering to obtain entities of knowledge graph fused from bottom to top, relations among the entities are further abstracted, and finally a global knowledge graph with higher abstract information at its top layer is formed to optimize the storage of knowledge graph and improve the query efficiency.

The above description is only some embodiments of the disclosure, but the scope of protection of the disclosure is not limited to these embodiments. Any equivalent substitutions or changes made by those skilled in the art according to the described technical solutions of the disclosure, and improvements thereof should be within the scope of protection of the disclosure.

What is claimed is:

1. A construction method of human-object-space interaction model based on knowledge graph, comprising the following steps:
    S1: obtaining information from active sensing devices and passive sensing devices and thereby building a knowledge base;

S2: fusing perceptual information in the knowledge base built in Si to form entity-relationship-entity structured data, and building a general knowledge graph conceptual model with entity-relation attributes;

S3: materializing human-object-space information in different geographical locations, building a multi-layered interaction knowledge graph entity model, and maintaining blockchains of the multi-layered interaction knowledge graph entity model;

wherein S3 specifically comprises:

S301: partitioning the multi-layered interaction knowledge graph entity model for the different geographical locations to obtain human-object-space interaction knowledge graph partitions, the knowledge graph partitions maintaining respective private blockchains; and for a same one of the different geographical locations, heterogeneous data from different sources being uploaded to the private blockchain, and after all nodes on the private blockchain are audited and reach a consensus, retaining effective heterogeneous data configured to enter a next stage of the cross-chain fusion and thereby obtain the traceable multi-layered knowledge graph model; and S302: during collecting the heterogeneous data, using a real-time clustering method to cache different real-time stream data and verify the real-time stream data;

S4: obtaining a traceable multi-layered knowledge graph model by cross-chain fusion of the blockchains;

wherein S4 specifically comprises:

S401: the private blockchains maintained by the respective knowledge graph partitions, based on a multi-layered multi-chain architecture of side chains or relay chains, fusing the knowledge graph partitions by a cross-chain data fusion method;

S402: the private chain maintained by each of the knowledge graph partitions being used as a side chain to work in parallel with a main blockchain, and nodes of the main blockchain connecting to the side chain or being connected by the side chain; and S403: the side chain independently from the main blockchain collecting heterogeneous data of multiple source devices in a corresponding one of the different geographical locations, or performing data fusion of heterogeneous data together with the main blockchain;

S5: for knowledge graph partitions organized by the geographical locations at a bottom layer of the traceable multi-layered knowledge graph model, aggregating the knowledge graph partitions based on similarity by feature clustering to generate knowledge graph clusters; and wherein the aggregating the knowledge graph partitions based on similarity in S5 specifically comprises:

S501: extracting main features of each of the knowledge graph partitions by feature engineering; and S502: classifying a series of knowledge graph partitions through a machine learning feature clustering method;

S6: fusing entities and relations of knowledge graph from bottom to top based on the knowledge graph clusters, abstracting higher-layer knowledge graph information, and generating a global knowledge graph with higher abstract information at a top layer;

wherein S6 specifically comprises:

S601: for the global knowledge graph being queryable anywhere at its bottom layer, performing fusion on the knowledge graph clusters generated in S5, and generating a knowledge graph at the bottom layer and fusing knowledge graph partitions in the same knowledge graph cluster of the knowledge graph at the bottom layer to obtain a higher-layer abstract knowledge graph; forming a bottom-up pyramidal information abstract model including the knowledge graph located at the bottom layer and the higher-layer abstract knowledge graph located at an upper layer of the bottom layer as the global knowledge graph, and storing the bottom-up pyramidal information abstract model by using cross-chain fusion of blockchains, wherein a knowledge graph stored at a topmost layer of the bottom-up pyramidal information abstract model is a root node for querying, and thereby gradually searching down from the knowledge graph stored at the topmost layer of the bottom-up pyramidal information abstract model to the knowledge graph stored at the bottom layer of the bottom-up pyramidal information abstract model to obtain more specific information when querying.

2. The construction method of human-object-space interaction model based on knowledge graph according to claim 1, wherein S1 specifically comprises:

S101: acquiring entity information and direct relations among entities from data sources to obtain original data; and S102: extracting knowledge elements from the original data, and storing extracted knowledge elements into a schema layer and a data layer of the knowledge base.

3. The construction method of human-object-space interaction model based on knowledge graph according to claim 2, wherein S2 specifically comprises:

S201: after obtaining the knowledge elements, storing basic attribute knowledge, relation knowledge, and event knowledge;

S202: extracting entities, attributes, and relations among the entities from various types of data sources;

S203: fusing new knowledge and eliminating contradiction and ambiguation;

S204: performing quality evaluation on fused new knowledge; and

S205: building a knowledge graph through repeated iteration and updating as per S201 to S204.

4. A construction method of human-object-space interaction model based on knowledge graph, comprising the following steps:

S1: obtaining information from active sensing devices and passive sensing devices and thereby building a knowledge base;

S2: fusing perceptual information in the knowledge base built in Si to form entity-relationship-entity structured data, and building a general knowledge graph conceptual model with entity-relation attributes;

S3: materializing human-object-space information in different geographical locations, building a multi-layered interaction knowledge graph entity model, and maintaining blockchains of the multi-layered interaction knowledge graph entity model;

S4: obtaining a traceable multi-layered knowledge graph model by cross-chain fusion of the blockchains;

S5: for knowledge graph partitions organized by the geographical locations at a bottom layer of the traceable multi-layered knowledge graph model, aggregating the knowledge graph partitions based on similarity by feature clustering to generate knowledge graph clusters; and S6: fusing entities and relations of knowledge graph from bottom to top based on the knowledge graph clusters, abstracting higher-layer knowledge graph information, and generating a bottom-up pyramidal information abstract model;

wherein S6 specifically comprises:

S601: generating a knowledge graph at a bottom layer of the bottom-up pyramidal information abstract model, and fusing knowledge graph partitions in the same knowledge graph cluster of the knowledge graph at the bottom layer to obtain a higher-layer abstract knowledge graph at an upper layer of the bottom layer, and storing the bottom-up pyramidal information abstract model by using cross-chain fusion of blockchains, wherein a knowledge graph stored at a topmost layer of the bottom-up pyramidal information abstract model is a root node for querying; and gradually searching down from the knowledge graph stored at the topmost layer of the bottom-up pyramidal information abstract model to the knowledge graph stored at the bottom layer of the bottom-up pyramidal information abstract model to obtain more specific information when querying.

* * * * *